United States Patent [19]

Henning

[11] 4,353,341
[45] Oct. 12, 1982

[54] METHOD AND APPARATUS FOR VARYING THE SPACING OF IGNITION CONTROL PULSES EMITTED BY AN IGNITION PULSE TRANSDUCER

[75] Inventor: Manfred Henning, Kaarst, Fed. Rep. of Germany

[73] Assignee: Robert Bosch GmbH, Stuttgart, Fed. Rep. of Germany

[21] Appl. No.: 214,068

[22] Filed: Dec. 8, 1980

[30] Foreign Application Priority Data

Dec. 7, 1979 [DE] Fed. Rep. of Germany ....... 2949311

[51] Int. Cl.³ .............................................. F02D 5/04
[52] U.S. Cl. .................................... 123/414; 123/419
[58] Field of Search ............... 123/415, 416, 414, 651, 123/652, 614, 617, 419, 436

[56] References Cited
U.S. PATENT DOCUMENTS

| | | | |
|---|---|---|---|
| 4,104,990 | 8/1978 | Frobenius | 123/436 |
| 4,133,323 | 1/1979 | Adler | 123/416 |
| 4,134,374 | 1/1979 | Latsch et al. | 123/436 |
| 4,232,368 | 11/1980 | Hill et al. | 123/416 X |
| 4,236,085 | 11/1980 | An et al. | 123/416 X |

Primary Examiner—Tony M. Argenbright
Attorney, Agent, or Firm—Edwin E. Greigg

[57] ABSTRACT

A method of varying the phase spacing of sequential ignition pulses emitted by an ignition pulse transducer and an apparatus for performing the method are proposed, in which with the aid of a phase control circuit a corrected ignition control pulse train of average frequency is formed on the basis of an actual ignition control pulse train. The corrected pulse train being held constant so long as a given phase difference is maintained between the two control pulse trains. As a result, brief rpm fluctuations, which in an rpm range in the vicinity of idling rpm are perceived as jerking, are compensated for. When there are changes in rpm which cause larger phase deviations, the corrected ignition control pulse train is synchronized with the actual ignition control pulse train.

10 Claims, 1 Drawing Figure

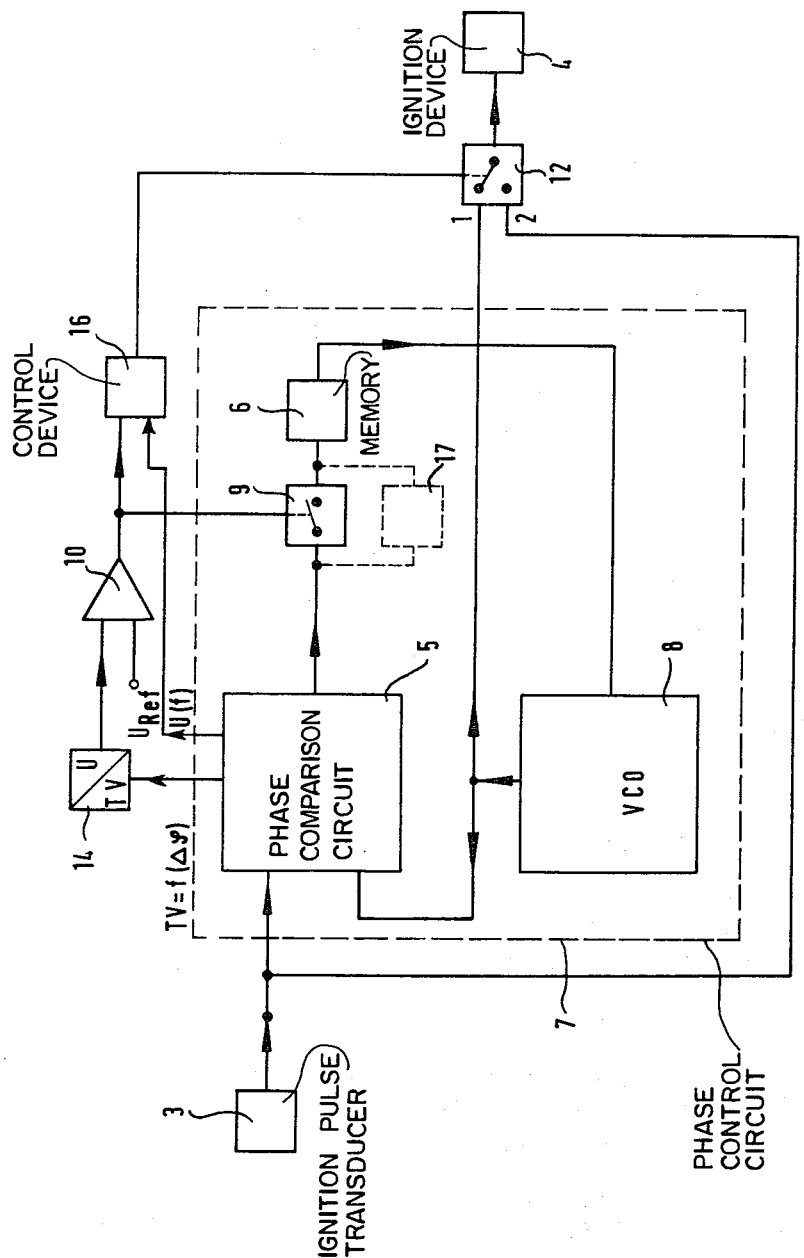

METHOD AND APPARATUS FOR VARYING THE SPACING OF IGNITION CONTROL PULSES EMITTED BY AN IGNITION PULSE TRANSDUCER

BACKGROUND OF THE INVENTION

The invention is based on a method and apparatus for varying the spacing of sequential ignition control pulses emitted by a transducer which controls an ignition device. Phase spacing of the pulses is influenced with a phase-control circuit. In a known method of this kind, in order to vary the instant of ignition for the entire operational range of the internal combustion engine, a phase delay circuit is provided between the voltage-controlled oscillator and the phase comparison circuit of a phase control circuit; the delay time of this phase delay circuit is variable in accordance with operating parameters of the engine. In this method, a signal emitted by an ignition angle transducer is present at the input of the phase comparison circuit, which is delivered to the ignition device of the engine after having been corrected by way of the voltage-controlled oscillator. With this apparatus, however, only a phase advance of the control signal picked up at the voltage-controlled oscillator, that is, an advance with respect to the control signal emitted by the ignition angle transducer, can fundamentally be attained (See German Offenlegungsschrift i.e., laid open application, No. 27 08 245).

ADVANTAGES OF THE INVENTION

The method and apparatus according to the invention has the advantage over the prior art that, with very simple means, jerking which occurs substantially during constant driving at low rpm, and which is caused by thermodynamic influences and by dynamic influences of the gear mechanism of the vehicle being driven by the engine, can be prevented.

As a result of the characteristics disclosed in the dependent claims, advantageous modifications of the method, and advantageous realizations of an apparatus for performing the method, are disclosed.

BRIEF DESCRIPTION OF THE DRAWING

One exemplary embodiment of an apparatus in block diagram form is illustrated in the drawing and described in detail below.

DESCRIPTION OF THE PREFERRED EMBODIMENT

Preferably rectangular pulses are generated in an rpm-synchronous cycle by an ignition pulse transducer 3 which is not shown in detail; these signals are delivered for control purposes to an ignition device 4, also not shown in detail, in which a high-voltage pulse is generated which is delivered to the appropriate ignition location. The apparatus according to the invention for varying the spacing of the sequential ignition control pulses is now provided between the ignition device 4 and the ignition pulse transducer 3.

The apparatus substantially comprises a phase control circuit 7, in turn comprising a phase comparison circuit 5 of a memory or integration device 6 and a voltage-controlled oscillator 8. The first input of the phase comparison circuit 5 is connected with the output of the ignition pulse transducer 3, and the second input of the phase comparison circuit 5 is connected with the output of the voltage-controlled oscillator 8. The output of the phase comparison circuit 5 leads via the memory 6 to the input of the voltage-controlled osciallator 8. In a modification of a conventional phase control circuit; a switch 9 is now provided between the output of the phase comparison device 5 and the memory 6. This switch 9 is controlled by the output signal of a comparator device 10. The output of the voltage-controlled oscillator 8 is further connected with a switchover device 12, by means of which a connection is provided, in a first position of the device 12, between the output of the voltage-controlled oscillator 8 and the ignition device 4. In a second position of the switchover device 12, a connection is furnished between the output of the ignition pulse transducer 3 and the ignition device 4, and the connection to the voltage-controlled oscillator 8 is interrupted.

The comparator device 10 controlling the switch 9 receives at its first input an actual-value signal from a converter 14, corresponding to the phase deviation of the actual ignition control pulse train emitted by the ignition pulse transducer 3 in comparison with the pulse train emitted by the voltage-controlled oscillator 8. To this end, the converter 14 is connected with the output of the phase comparison circuit 5, at which a pulse train is present whose duty cycle corresponds to the deviation noted above of the actual ignition pulse train from the pulse train emitted by the voltage-controlled oscillator. Thus far the signal under consideration is the conventional output signal of the phase comparison circuit 5 of 2 the phase control circuit 2. At the other input of the comparator device 10, a reference voltage U Ref for a permissible phase difference is applied.

The apparatus functions as follows:

Ignition pulses are emitted in synchronism with the engine rpm by the ignition pulse transducer 3, with the aid of which pulses an ignition device 4, designed by way of example as a transistorized ignition system is controlled. It is known that even at a constant engine rpm the average combustion chamber pressures can deviate from one another during the various individual strokes of the engine; on the one hand, this is a result of the thermodynamic process, and on the other, it is caused by the various forms of resistance to which the engine, in operating a motor vehicle, is subjected. This varying combustion chamber pressures, especially in the idling rpm range, cause rpm fluctuations which can make themselves quite unpleasantly evident in the form of jerking. According to the described embodiment of the invention, the actual ignition control pulse train representing the momentary rpm is now delivered from the ignition pulse transducer 3 to the first input of the phase comparison circuit 5. When the switch 9 is closed, the phase control circuit 7 functions in a conventional manner. In accordance with the phase difference signal present at the output of the phase comparison circuit 5, the voltage-controlled oscillator 8 is controlled via the memory 6 in such a manner that a pulse train appears at its output which has an average frequency, relative to the actual ignition control pulse frequency. This pulse train is delivered to the ignition device 4, so long as the switchover device 12 is located in its first position. On the basis of the output signal of the phase comparison circuit 5, in the form of ignition pulses having a duty cycle which is in proportion to the phase difference, a voltage proportional to the phase deviation is generated in the converter 14, but the algebraic sign of the phase difference is not ascertained. This voltage is compared in the comparator device 10 with the differential value of the permissible phase deviation; if there is a failure to attain the permissible phase difference, the comparator device 10 open the switch 9. From this moment, the most recent phase differential value contained in the memory 6 is a standard for the control of the voltage-controlled oscillator 8, which now, independently of the frequency of the actual ignition control pulse train, emits a control pulse train having a constant frequency corresponding to the value stored in memory 6 and controls the ignition device 4 therewith.

As long as the reference threshold of the comparator device 10 is not attained, the ignition train has a constant frequency, independently of the actual engine rpm. Brief rpm fluctuations having low amplitude accordingly cause ignitions which are early or late in comparison with ignition at an average rpm. If there is a brief increase in rpm, for instance, or a shortening in the spacing of the pulses emitted by the ignition pulse transducer 3, then the control pulse emitted by the voltage-controlled oscillator 8 represents an adjustment toward "late", which affects the torque generated by the engine in such a way that the rpm increase is again compensated for. Similarly, if there is a drop in rpm the result is an adjustment toward "early" as a result of the ignition control pulse train of the voltage-controlled oscillator 8 as compared with the actual control pulse train, and thus there is a compensating increase in rpm.

Within one band width, which is represented by the reference value of the comparator device 10, the rpm of the engine can be held constant by means of a resultant adjustment toward "late" or "early" by the amount of $\pm \Delta \alpha$, and thus, especially in the idling range, unpleasant jerking can be eliminated. However, if at a desired increase in rpm the reference value is not attained, then the switch 9 is closed and the voltage-controlled oscillator 8 is phase-synchronized with the frequency of the actual ignition control pulse train.

As long as the switchover device 12 is in its first position, the subsequent ignition device 4 is controlled by the output signals of the voltage-controlled oscillator 8. In contrast, the switchover device 12 switches into its second position, in which the actual ignition pulse train is connected with the ignition device 4, whenever one or both of the following conditions is substantially met:

1. a given lower rpm threshold fails to be attained; and
2. a given amount of phase difference is exceeded.

The first condition assures that the engine will be started with the actual ignition pulse train, and the starting process will thus not be negatively affected by the described control device 16. The second condition assures that when rapid rpm changes are desired, there will be no excessively great deviations from the actual ignition control frequency, which would have a negative effect on an rpm increase, for instance.

For controlling the switchover device, a control device 16 is accordingly provided, whose inputs are connected with the output of the comparator device 10 and/or an rpm transducer for the actual rpm of the engine. Depending upon whether only one of the above conditions or both are to be used as the criterion for switching over the switchover device 12, a first comparator device is provided in the control device 16 which compares the output signal of the comparator device 10 with a reference value U(f) for the maximal phase difference and/or a second comparator device is provided with compares the actual engine rpm with a minimum rpm value. If both parameters are used, then a logic linkage is provided, by way of which when both conditions are present the switchover device 12 is either kept in its first position or switched into its second position. In this manner, and also with an appropriate embodiment of the control device 16, a desired rpm range, for instance and preferably one at which the jerking, which is to be avoided, tends to occur, can be selected and the switchover device 12 can be brought into the first position for this rpm range, which is the position at which the apparatus according to the invention for varying the phase spacing of the ignition control pulses is effective.

A further embodiment, which improves the dynamic behavior of the apparatus, has a low-pass filter 17 switched parallel to the switch 9 with the aid of which, when the switch 9 is opened, the contents of the memory 6 are gradually made to equal the output value of the phase comparison device 5. In this manner, the instant of ignition, controlled by the output signal of the voltage-controlled oscillator 8, is slowly shifted in the direction of the instant of ignition provided by the ignition pulse transducer, so that in actually only brief rpm fluctuations, which could cause jerking, are compensated for. Long-term rpm changes are thus still made even when the switch 9 is opened.

I claim:

1. A method for varying the spacings of sequential ignition control pulses of an actual ignition control pulse train emitted by an ignition pulse transducer, for controlling, along with a voltage-controlled oscillator, an ignition device, comprising the steps of:
   generating an actual ignition control pulse train by the ignition pulse transducer;
   generating a corrected ignition control pulse train of average frequency from the generated actual ignition control pulse train;
   establishing a given phase difference between the corrected ignition control pulse train and the actual ignition control pulse train;
   comparing the phase difference between the corrected ignition control pulse train and the actual ignition control pulse train; and
   maintaining the most recent output of the voltage controlled oscillator when the given phase difference is not attained.

2. The method as defined in claim 1, further comprising the steps of:
   establishing a minimum frequency of the actual ignition control pulse train;
   establishing a maximal phase difference between the corrected ignition control pulse train and the actual ignition control pulse train; and
   connecting the ignition device directly to the ignition pulse transducer when the minimum frequency of the actual ignition control pulse train is not attained and when the maximal phase difference is exceeded.

3. An apparatus for varying the spacing of sequential ignition control pulses of an actual ignition control pulse train emitted by an ignition pulse transducer, for controlling an ignition device, comprising:
   a phase control circuit including a phase comparison circuit connected at one input with the ignition pulse transducer, a voltage-controlled oscillator connected to the ignition device and to another input of the phase comparison circuit, a switch connected to an output of the phase comparison circuit, and a memory connected to the switch and to the voltage-controlled oscillator;

a converter connected to an output of the phase comparison circuit for generating a voltage proportional to the duty cycle of the output signal from the phase comparison circuit; and a comparator device connected to the converter and the switch, said switch being switchable in accordance with the output signal of the comparator device for connecting the output signal of the phase comparison circuit to the memory, and said phase control circuit serving to generate a corrected ignition control pulse train of average frequency from the generated actual ignition control pulse train emitted by the ignition pulse transducer when the output signal of the phase comparison circuit is connected to the memory by the switch.

4. The apparatus as defined in claim 3, further comprising:

a switchover device connected to the ignition device, said switchover device having two positions, one of which connects the switchover device to the voltage-controlled oscillator and the other of which connects the switchover device to the ignition pulse transducer; and a control device connected to the switchover device and the comparator device, said control device controlling the positions of the switchover device, and for this purpose includes a comparator which compares the output of the comparator device with a reference value for ascertaining whether a given phase difference is exceeded.

5. The apparatus as defined in claim 3, further comprising:

a switchover device connected to the ignition device, said switchover device having two positions, one of which connects the switchover device to the voltage-controlled oscillator and the other of which connects the switchover device to the ignition pulse transducer; and a control device connected to the switchover device and the comparator device, said control device controlling the positions of the switchover device, and for this purpose includes a comparator for ascertaining the failure to attain an rpm threshold.

6. The apparatus as defined in claim 3, further comprising:

a switchover device connected to the ignition device, said switchover device having two positions, one of which connects the switchover device to the voltage-controlled oscillator and the other of which connects the switchover device to the ignition pulse transducer; and a control device connected to the switchover device and the comparator device, said control device controlling the positions of the switchover device, and for this purpose includes a first comparator which compares the output of the comparator device with a reference value for ascertaining whether a given phase difference is exceeded, a second comparator for ascertaining the failure to attain an rpm threshold and a logic device connected to the first and second comparator for forming a switching signal by means of which the switchover device is brought into its second position.

7. The apparatus as defined in claim 3, wherein the phase control circuit further includes a low-pass filter connected in parallel with the switch.

8. The apparatus as defined in claim 7, further comprising:

a switchover device connected to the ignition device, said switchover device having two positions, one of which connects the switchover device to the voltage-controlled oscillator and the other of which connects the switchover device to the ignition pulse transducer; and a control device connected to the switchover device and the comparator device, said control device controlling the positions of the switchover device, and for this purpose includes a comparator which compares the output of the comparator device with a reference value for ascertaining whether a given phase difference is exceeded.

9. The apparatus as defined in claim 7, further comprising:

a switchover device connected to the ignition device, said switchover device having two positions, one of which connects the switchover device to the voltage-controlled oscillator and the other of which connects the switchover device to the ignition pulse transducer; and a control device connected to the switchover device and the comparator device, said control device controlling the positions of the switchover device, and for this purpose includes a comparator for ascertaining the failure to attain an rpm threshold.

10. The apparatus as defined in claim 7, further comprising:

a switchover device connected to the ignition device, said switchover device having two positions, one of which connects the switchover device to the voltage-controlled oscillator and the other of which connects the switchover device to the ignition pulse transducer; and a control device connected to the switchover device and the comparator device, said control device controlling the positions of the switchover device, and for this purpose includes a first comparator which compares the output of the comparator device with a reference value for ascertaining whether a given phase difference is exceeded, a second comparator for ascertaining the failure to attain an rpm threshold and a logic device connected to the first and second comparator for forming a switching signal by means of which the switchover device is brought into its second position.

* * * * *